United States Patent [19]
Petrick et al.

[11] Patent Number: 5,892,966
[45] Date of Patent: Apr. 6, 1999

[54] PROCESSOR COMPLEX FOR EXECUTING MULTIMEDIA FUNCTIONS

[75] Inventors: Bruce E. Petrick, Sunnyvale; Mukesh Patel, Fremont, both of Calif.

[73] Assignee: Sun Microsystems, Inc., Palo Alto, Calif.

[21] Appl. No.: 884,257

[22] Filed: Jun. 27, 1997

[51] Int. Cl.$^6$ .............................. G06F 9/44; G06F 13/40
[52] U.S. Cl. ................................. 395/800.36; 395/800.22; 707/104
[58] Field of Search .............................. 395/378, 800.34, 395/827, 800.22, 678, 814.21, 881, 737, 800.36, 800.17, 309; 707/206, 104, 101; 379/93.17, 88.13; 348/19; 340/825.47; 364/DIG. 1, DIG. 2

[56] References Cited

U.S. PATENT DOCUMENTS

| | | | |
|---|---|---|---|
| 4,383,257 | 5/1983 | Giallanza ............................ | 340/825.47 |
| 5,490,272 | 2/1996 | Mathis et al. ............................ | 395/678 |
| 5,535,414 | 7/1996 | Burge ...................................... | 395/827 |
| 5,748,983 | 5/1998 | Gulick et al. ............................ | 395/842 |

Primary Examiner—Daniel H. Pan
Attorney, Agent, or Firm—William L. Paradice, III

[57] ABSTRACT

A computer processor complex including a hardware processor coupled to a multimedia coprocessor is provided. This computer processor complex is capable of separately processing a stream of non-multimedia instructions in addition to a stream of multimedia instructions such as are used in MPEG audio and video. The computer processor complex includes a visible register set including registers for a program counter and a data pointer. The program counter is used to hold the address in memory where the multimedia instructions are located and the data pointer indicates where the data, corresponding to these multimedia instructions, is located in memory. A hardware processor is coupled to a first bidirectional port on the visible register set and a multimedia coprocessor is coupled to a second bidirectional port on the visible register set. The bidirectional ports allow the hardware processor and the coprocessor to exchange data and status information typically using an interrupt based communication mechanism. A main memory device is also coupled to the hardware processor over bidirectional port and coupled to the multimedia processor over a second bidirectional port. This arrangement allows the hardware processor and the coprocessor to share main memory and load separate instruction streams from main memory.

15 Claims, 8 Drawing Sheets

PROCESSOR COMPLEX FOR EXECUTING MULTIMEDIA FUNCTIONS

RELATED APPLICATIONS

This application is related to U.S. application Ser. No. 08/884,256, filed Jun 27, 1997, entitled "A MODULAR COPROCESSOR UNIT WITH INTEGRATED MULTIMEDIA FUNCTIONS" and U.S. application Ser. No. 08/884,255, filed Jun. 27, 1997, entitled "METHOD AND SYSTEM FOR COUPLING A STACK BASED PROCESSOR TO A REGISTER BASED FUNCTIONAL UNIT", both of which are assigned to the assignee of the present invention and are incorporated herein by reference, in their entirety, for all purposes.

FIELD OF THE INVENTION

The present invention relates generally to computer architecture and, more specifically, to a processor complex for executing multimedia functions.

BACKGROUND OF THE INVENTION

An increasing number of devices used in business and home are controlled by small embedded microprocessors. Generally, these embedded processors are low-cost and include a limited amount of memory or storage for executing applications. Consequently, the applications executed on these embedded processors must also be relatively small and compact.

It is also desirable that these small applications be interoperable with a large class of devices, such as cellular phones, manufactured by different companies. This reduces the costs associated with developing software applications and therefore decreases the overall cost of ownership for the device. For example, cellular phone users should be able to transfer applications to each other and download them into their phone for processing. This would greatly enhance the flexibility and feature set on cellular phones even though the phones may be different models designed by different manufacturers.

A general purpose stack based processor fits these requirements well because stack instructions tend to be small and compact. The general purpose stack based processor includes a stack for storing operands and a stack processor which processes instructions by popping one or more operands off the stack, operating on them, and then pushing the results back on the stack for another instruction to process. Essentially, stack based executables are compact because the stack instructions reference operands implicitly using the stack rather than explicitly in the instructions. Storage saved by not referencing operands such as registers, memory addresses, or immediate values explicitly can then be used to store additional stack instructions.

Embedding a general purpose stack based processors in a wide variety of devices is also very cost effective. Compared with RISC (reduced instruction set computer) or CISC (complex instruction set computer) processors, stack processor research and development costs are relatively low. Another part of the cost effectiveness is based on developing software that can be shared and used by a wide variety of different devices. By increasing software interoperability between devices, stack based processors can be produced in high volumes, low profit margins, and yet high overall profits. For example, software applications consisting of architecturally neutral bytecode instructions can be readily shared when designed for execution on a Java Virtual Machine (JVM) stack based processor such as described in the book, "The Java Virtual Machine Specification" by Tim Lindholm and Frank Yellin, published by Addison-Wesley, 1997. These bytecode instruction based software applications are compact and substantially interoperable with almost any device utilizing, or simulating, a JVM stack based processor.

In most cases, these embedded processors are also required to perform many high performance multimedia operations involving digital video and audio. Typically, the embedded processor must decode images and audio stored in a compressed data format called MPEG[1]. MPEG employs two basic techniques for video compression: block-based motion compensation for the reduction of the temporal redundancy (i.e. several frames in a video sequence remain substantially the same over time) and discrete cosine transform (DCT) coding for the reduction of spatial redundancy (i.e. images within a frame are the same color or have the same intensity levels). To exploit temporal redundancy, MPEG uses intra-frames (I frames), predicted frames (P frames), and bidirectionally interpolated frames (B frames) to record the differences between each video image rather than the complete image. To exploit spatial redundancy, discrete cosine transforms (DCT) are used to convert pel (picture element) values from the spatial domain (i.e. intensity variations based on distance in an image) into the frequency domain (i.e. intensity variations based in terms of frequency in an image). In the frequency domain, the pixels in an image are represented as a combination of frequencies using a series of DCT coefficients. If images are moving within a frame, motion-compensated prediction uses motion vectors to represent a current frame as a translation of pixel values from a reference frame. Finally, the remaining pixel values and DCT coefficients are further compressed using run-length coding techniques well known in the art.

[1]. MPEG (Moving Pictures Expert Group) is a group of people that meet under ISO (International Standards Organization) to generate standards for digital video (temporal sequencing of images) and audio compression. MPEG is a nickname for the video/audio standards and the official name is ISO/IEC JTC 1 SC29 WG11 where IEC is International Electro-technical commission; JTC1 is Joint Technical Committee 1; SC29 is Subcommittee 29; and WG11 is Work Group 11.

Unfortunately, general purpose stack based processors are generally not well suited for performing high-performance multimedia or other real time processing. In part, performance is often impacted on a stack based processor manipulating the stack to gain access to the operands. Generally, numerous machine cycles are spent pushing and popping operands on the stack. For example, graphic processing on a stack based processor is difficult because the instruction can not manipulate groups of pixels or data points as needed when performing various digital signal processing based compression/ decompression techniques such as MPEG video or digital Dolby/AC-3 based audio. Processing groups of pixels on a stack based processor would require numerous stack operations and would be inefficient. Potentially, each pixel value would have to be pushed on the stack and operated on. Each calculation would be a separate operation and it would be difficult to take advantage of redundant calculations that generally occur in image processing and audio processing. Clearly, additional processing required on a stack based processor would make it difficult to perform these calculations in a time frame acceptable for users expecting real-time multimedia effects.

General purpose hardware processors are also not well suited for multimedia applications due to inherent architectural limitations. For example, many general purpose processors employ a cache memory and cache controller to manage the use of high speed cache among many applications. Typically, the cache controller swaps data in and out of cache to minimize the number of cache misses. Unfortunately, MPEG video streams decoding and other multimedia operations need cache and other high speed memory for extended periods of time. Further, many multimedia applications often need more space than these cache can provide. Thus, the unavailability of memory and frequent cache misses can make multimedia operations, such as MPEG video, appear choppy, slow, and generally low quality.

Several manufacturers have integrated graphics functions into the general purpose processor to increase multimedia performance executing applications. The UltraSparc processors designed and marketed by Sun Microsystems, Inc. employ VIS (visual instruction set) integrated graphic functions. Designing a central processor with integrated graphics functions is described in U.S. patent application Ser. No. 08/638,390, filed Apr. 26, 1996, entitled "A CENTRAL PROCESSING UNIT WITH INTEGRATED GRAPHICS FUNCTIONS", authored by Robert Yung, and assigned to the assignee of the present invention. Intel Corporation has also designed several processors with integrated graphic functions based upon the MMX instruction set. Many of these solutions attempt to operate the multiple integrated graphics functions in parallel using sophisticated compilers and hardware mechanisms to schedule instructions. However, the complexity of these integrated graphic functions often leads to structural hazards (i.e. contention for the same hardware resources) and data hazards (i.e. data dependencies) which leave portions of the processor idle waiting for results or resources.

What is needed is a processor complex capable of executing multimedia applications and scalable to a wide range of processing environments.

SUMMARY OF THE INVENTION

A computer processor complex including a hardware processor coupled to a multimedia coprocessor is provided. This computer processor complex is capable of processing a stream of non-multimedia instructions in addition to a stream of multimedia instructions such as used in MPEG audio and video.

In one embodiment, the computer processor complex includes a visible register set including registers for a program counter and a data pointer. The program counter is used to hold the address in memory where the multimedia instructions are located and the data pointer indicates where the data, corresponding to these multimedia instructions, is located in memory. A hardware processor is coupled to a first bidirectional port on the visible register set and a multimedia coprocessor is coupled to a second bidirectional port on the visible register set. The bidirectional ports allow the hardware processor and the coprocessor to exchange data and status information typically using an interrupt based communication mechanism. A main memory device is also coupled to the hardware processor over a first bidirectional port and coupled to the multimedia processor over a second bidirectional port. This arrangement allows the hardware processor and the coprocessor to share main memory and load separate instruction streams from main memory.

In another embodiment, the multimedia coprocessor includes an instruction fetch and decode unit which is coupled to a plurality of multimedia coprocessor execution units including a coprocessor integer execution unit and a coprocessor multimedia execution unit. To improve performance, the coprocessor includes a superscalar architecture and each of the execution units includes a plurality of pipelined stages. Accordingly, the multimedia execution unit has several integer execution units which can be executed in parallel for improved multimedia performance. A visible register set is coupled to the coprocessor integer execution unit for receiving operands to initialize operation of the coprocessor. Further, a first register file is coupled to the multimedia execution unit and a second register file is coupled to the integer execution unit. A main memory device is coupled to the integer execution unit and contains instructions and data executable on the multimedia coprocessor.

In another aspect of the present invention, the coprocessor integer execution unit in the coprocessor further includes an ALU execution unit and a local memory unit, each separately coupled to the instruction fetch and decode unit. The local memory unit includes a block move device used for moving values between main memory, the first register file and the second register file. The local memory device is particularly useful when performing multimedia operations requiring deterministic access to memory over a fixed period of time.

In yet another aspect of the present invention, the multimedia execution unit in the coprocessor further comprises a first integer execution unit and a second integer execution unit, each separately coupled to the instruction fetch and decode unit. The first integer execution unit includes a multiply ALU and the second integer execution includes an adder ALU which can execute in parallel to perform a variety of video processing instructions quickly. The multiply and add operations are often used to decode MPEG video bit streams.

A method for processing one or more multimedia instructions on the hardware processor in conjunction with the multimedia coprocessor is also provided. Initially, the hardware processor is executing a instruction stream of one or more non-multimedia instructions. At some point during execution, the hardware processor encounters an indicator within the instruction stream that one or more multimedia instructions are contained within the main memory device. This indicator can be an interrupt, a message from the operating system, or can also be a special instruction which explicitly indicates that a multimedia application is in memory. The hardware processor determines an instruction location where the one or more multimedia instructions are located in memory. A data location in main memory where the one or more data values associated these multimedia instructions are located is also determined. The instruction location and the data location address are stored in a program counter register and a data pointer register location respectively, both registers are located in a visible register set. Once the visible registers are loaded, a first indication is transmitted to the multimedia processor indicating that the multimedia processor should begin processing the multimedia instructions located in main memory. The multimedia coprocessor loads the instruction location stored in the program counter register and begins executing the multimedia instructions in main memory. At some point during the processing of the multimedia instructions, the multimedia coprocessor transmits an indication to the hardware processor indicating processing status. The multimedia coprocessor can use the visible registers to send indicators to the hardware processor or, alternatively, can use interrupts, exception instructions, message passing, or other interprocessor communication techniques well known to those skilled in the art of multiprocessor architecture.

Embodiments of the invention provide a novel architecture with several advantages. First, the coprocessor is designed in a modular manner and can be easily integrated for use by a hardware processor. The visible register file can be written to by the hardware processor indicating where a multimedia application is loaded in memory. The hardware processor can also receive interrupts and interrupt values indicating what is the coprocessor's execution status. In particular, embodiments of this invention can be used to accelerate the performance of a stack based processor, such as the PicoJava processor designed by Sun Microsystems, Inc., by adding a coprocessor designed in accordance with the present invention. The coprocessor executes VIS (visual instruction set) instructions, also designed by Sun Microsystems, Inc., for performing multimedia operations.

The architecture of the present invention is also advantageous because it can be used for both loosely and tightly coupled multiprocessing. A coprocessor designed in accordance with the present invention executes a stream of instructions separate from the instructions executed on the hardware processor. A separate fetch and decode unit in the coprocessor is used to decode instructions while the hardware processor continues to execute. This reduces the data dependencies and the structural dependencies. Having these separate instruction steams, embodiments of the present invention can provide multiprocessor performance.

Coprocessors of the present invention are also advantageous because multimedia applications often need dedicated amounts of memory and other resources to perform multimedia operations. On-chip local memory on the coprocessor can be allocated exclusively to a multimedia application while the hardware processor is processing another portion of the application. The sequential nature of data used in multimedia applications allows for data values to be fetched in advance and placed in local memory. Consequently, memory latency is hidden and multimedia operations, such as video, appear to be smooth and consistent.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Overall Computing Environment

A processor designed in accordance with the present invention includes hardware support for improved multimedia performance. Typical multimedia operations include decoding video and audio bit streams compressed using standards such as MPEG, H.261, and H.263 as well as digital signal processing used on audio signals for noise reduction, signal enhancement, or special effects. H.263 and H.261 are video compression standards used in video teleconferencing which are similar to MPEG, discussed above, except that the motion compensation techniques are designed to operate on images which are not as likely to move as much from frame to frame. As will be apparent from the discussion below, this hardware support is designed in a modular fashion which makes it compatible with a wide range of processors, including, but not limited to, the JAVA compatible PicoJava processor and general purpose x86 processors by Intel.

Figure 1:
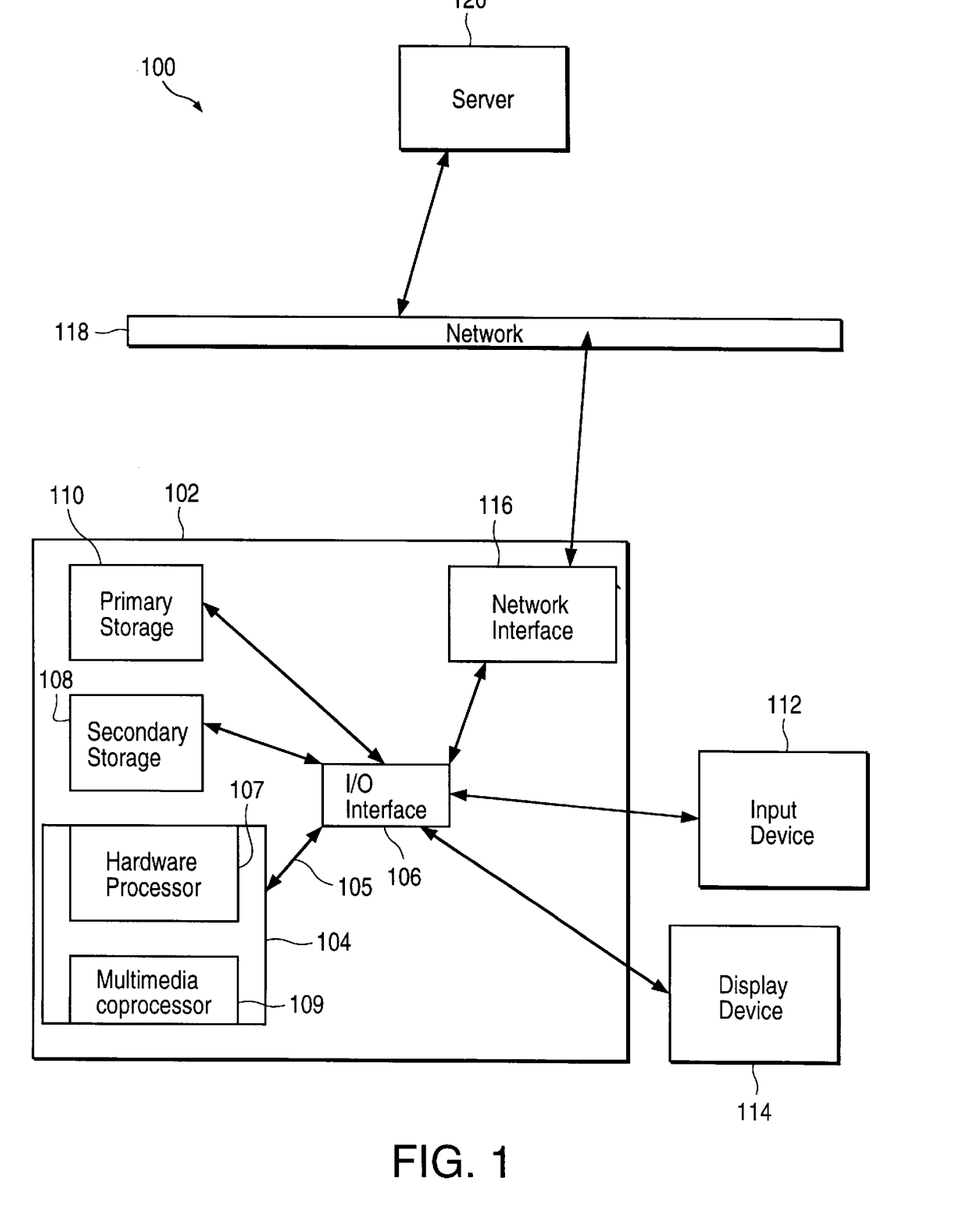
FIG. 1 illustrates a processor complex of the present invention embedded in a client processing node coupled to a server processing node over a computer network.

One embodiment of the present invention couples together a hardware processor and a multimedia coprocessor for improved stand-alone performance and interoperability compared with other processor architectures. Accordingly, FIG. 1 illustrates a network 100 including a client processing node 102 and a server processor node 120. A processor complex 104 of the present invention embedded in client processing node 102, also referred to as client 102, is coupled to server processing node 120, also referred to as server 120, over a computer network 118. Generally, client 102, server 120, and other nodes (not shown) coupled to this network transmit information utilizing the TCP/IP protocol. Other network protocols such as SNA, X.25, Novell Netware[1], Vines, or AppleTalk could also be used to provide similar client-server communication capabilities.

[1]. Netware is a registered trademark of Novell, Inc. in the United States and other countries.

Hardware processors used in server 120 and client 102 are typically designed around a standard stack processor design for the greatest degree of interoperability. The stack based architecture used by embodiments of the present invention facilitates the ready exchange of data and stack instructions in a heterogeneous distributed programming environment. For example, a stack based processor can be designed according to the "The Java Virtual Machine Specification", authored by Timothy Lindholm and Frank Yellin, Addison-Wesley, 1997 and capable of processing architecturally neutral bytecode instructions arranged in a predetermined format called a class file. Bytecode instructions are generated by compiling applications written in the JAVA object-oriented programming language but could also be generated from other programming languages using the appropriate compiler with the Java Virtual Machine as a target platform. For example, an application written in C or C++ can be compiled into bytecodes provided the compiler is capable of generating byte codes from a high-level programming language such as C and C++. A class file is a platform independent format which contains executable instructions. The class file format precisely defines the contents of such a file, including details such as byte ordering, which often is assumed in a platform specific file format.

Referring now to FIG. 1, client 102 includes processor complex 104, an I/O (input-output) interface 106, a secondary storage 108, a primary storage 110, an input device 112, a display device 114, and a network interface 116 which facilitates communication between these aforementioned elements. As previously discussed, network interface 116 couples client 102 to network 118 and facilitates communication between client 102 and other processing nodes on the network which typically includes exchanging data and distributed processing of applications.

Processor complex 104 is typically embedded in devices which require some data processing yet are limited by the cost and space requirements to a relatively small amount of memory. Typically, these devices include consumer devices which can be controlled by a processor such as cellular phones, televisions, and portable devices such as industrial devices such as process control systems, automated manufacturing and warehousing devices, instrumentation devices, and other industrial devices which require some amount of data processing.

Many, if not all, of the devices discussed above require multimedia capabilities which require moderate to complex data processing. These multimedia capabilities require simultaneous integer multiply and add operations to be performed on variable length codes, such as Huffman codes, and other operations as required for decoding MPEG video bit steams or Digital Dolby/AC-3 audio bit streams. One embodiment of the present invention implemented in processor complex 104 couples a stack based processor designed according to the PicoJava[1] architecture designed by Sun Microsystems and detailed in U.S. patent application Ser. No. 08/788,807, filed on Jan. 23, 1997 entitled "HARDWARE VIRTUAL MACHINE INSTRUCTION PROCESSOR", authored by Marc Tremblay and Michael O'Connor together with a multimedia processor capable of executing the Visual Instruction Set (VIS) also designed by Sun Microsystems and the subject of U.S. patent application Ser. No. 08/722,442, filed Oct. 10, 1996 entitled "VISUAL INSTRUCTION SET FOR CENTRAL PROCESSING UNIT WITH INTEGRATED GRAPHICS FUNCTIONS", authored by Robert Yung and U.S. patent application Ser. No. 08/638,390, filed Apr. 26, 1996, entitled "A CENTRAL PROCESSING UNIT WITH INTEGRATED GRAPHICS FUNCTIONS", authored by Robert Yung, these documents herein incorporated by reference in the entirety.

[1]. JAVA, PicoJAVA, UltraJAVA, HotJAVA, The Network Is the Computer, Sun, the Sun logo, Sun Microsystems, Solaris, and Ultra are trademarks or registered trademarks of Sun Microsystems, Inc. in the United States and in other countries. All SPARC trademarks are used under license and are trademarks or registered trademarks of SPARC International, Inc. in the United States and other countries. Products bearing SPARC trademarks are based upon an architecture developed by Sun Microsystems, Inc. UNIX is a registered trademark in the United States and other countries exclusively licensed through X/Open Company, Ltd.

Processor complex 104 can also include many other combinations of processors in addition to the processors discussed above. Accordingly, alternative embodiments of the present invention can also be used with processors based on the PowerPC processor available from Motorola of Schaumburg, Ill., or any of the Pentium or x86 compatible processors available from the Intel Corporation or other corporations such as AMD, and Cyrix.

In one embodiment, processor complex 104 includes a stack based processor and receives a series of stack instructions which retrieve data or write data to primary storage 110 or secondary storage 108, display information on display device 114, receive input signals from input devices 112, or retrieve data or write data to other processing nodes coupled to network 118 such as server 120.

Overall Processor Architecture

Figure 2:
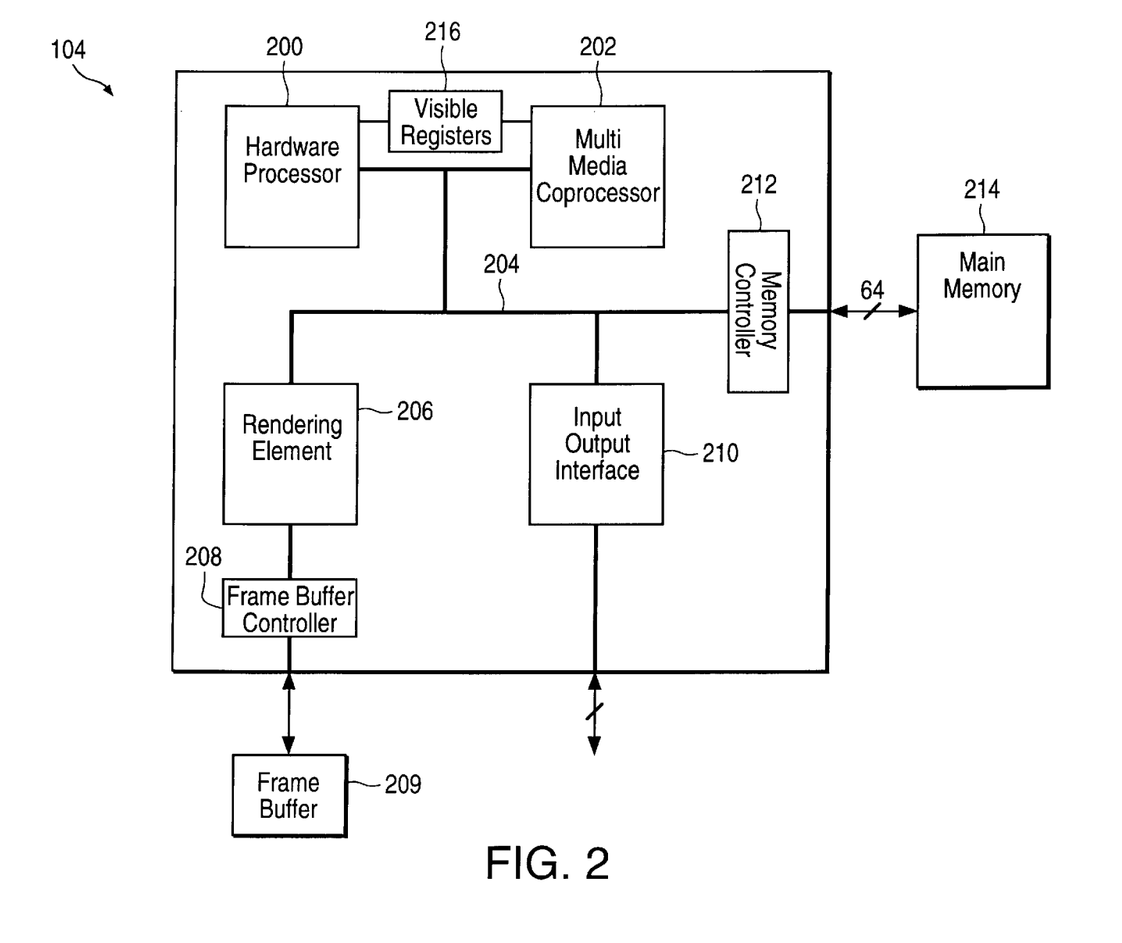
FIG. 2 is a block diagram illustrating the overall architecture of a processor complex designed in accordance with the present invention.

Referring now to FIG. 2, a block diagram illustrates the overall architecture of processor complex 104 in accordance with the present invention. Details have been omitted to better illustrate one embodiment of the invention wherein the connections between elements are exemplary and are not meant to limit the logical variations which would be applied by one skilled in the art.

As illustrated, processor complex 104 includes a hardware processor 200, a multimedia coprocessor 202, a bus 204, a rendering element 206, a frame buffer controller 208, a frame buffer 209, an input/output interface 210 such as a PCI (personal computer interface) controller or a FireWire/IEEE-1394 controller, a memory controller 212, a main memory device 214 such as SDRAM (synchronous dynamic random access memory) and a visible register set 216 coupled to hardware processor 200 and multimedia coprocessor 202.

Combining hardware processor 200 and multimedia coprocessor 202 provides multiprocessor performance processing instructions received over bus 204 from main memory device 214 with assistance from memory controller 212. Separate fetch and decode units in hardware processor 200 and multimedia coprocessor 202 are used to process the individual instruction streams provided for each processor unit. Executing independent instruction streams in parallel enables hardware processor 200 and multimedia coprocessor 202 to operate with less data hazards and structural hazards than other processors designed with integrated graphic support on a single chip. In particular, multimedia coprocessor 202 can produce high quality video output by decoding MPEG video frames without being interrupted by processing on hardware processor 200.

Input/output bus interface 210 couples processor complex 104 to peripheral devices (not shown) such as modems, keyboards, and disk devices. Interrupts and control signals generated by these peripheral devices are initially processed by hardware processor 200. If appropriate, hardware processor 200 forwards the interrupts or data to multimedia processor 202 for further processing using embodiments of the present invention. For example, multimedia processor 202 can generate control signals transmitted over bus 204 to rendering element 206 which, in turn, renders graphic primitives by sending pixel information to frame buffer controller 208. Frame buffer controller 208 writes these pixel values to appropriate locations in frame buffer 209 and updates the display device (not shown) with this pixel information.

Processor complex 104 also includes memory controller 212 coupled to main memory device 214 such as SDRAM (synchronous dynamic random access memory). Memory controller 212 receives data or requests for data over bus 204 and updates or extracts the information from main memory device 214 accordingly.

Coupling visible register set 216 to hardware processor 200 and multimedia coprocessor 202 provides one novel aspect of the present invention. Accordingly, register set 216 couples hardware processor 200 to multimedia coprocessor 202 in a modular manner and allows the two distinct processors to work together with a reduced amount of interface circuitry. Essentially, two processors can be coupled together for multiprocessing purposes using visible register set 216.

Hardware processor 200 uses visible register set 216 to control operation of multimedia coprocessor 202. In one embodiment, the registers in visible register set 216 are used by hardware processor 200 to set up initial execution parameters for multimedia coprocessor 202 such as the location of a software application in memory, location of data in memory, a program counter (PC) for the software application, and other information required by the multimedia processor 202. Further, visible register 216 can also be used to communicate status and result information back from multimedia coprocessor 202 to hardware processor 200. In one embodiment, visible register 216 is loaded using a hardware processor designed in accordance with the Pico-Java stack processor designed and marketed by Sun Microsystems, Inc. The PicoJava stack processor is compatible with a Java Virtual Machine (JVM) processor as described in, "The Java Virtual Machine Specification", by Tim Lindholm and Frank Yellin and also includes special Extended bytecode instructions for supporting operating system functions such as memory management, I/O (input-output), and context switching. A stack processor, such as the PicoJava stack processor, executes these extended bytecode instructions to load visible register set 216 with values useful in controlling the operation of multimedia processor 202. Details on the use of visible register set 216 in this context is discussed in further detail below.

Multimedia Coprocessor Architecture

Figure 3:
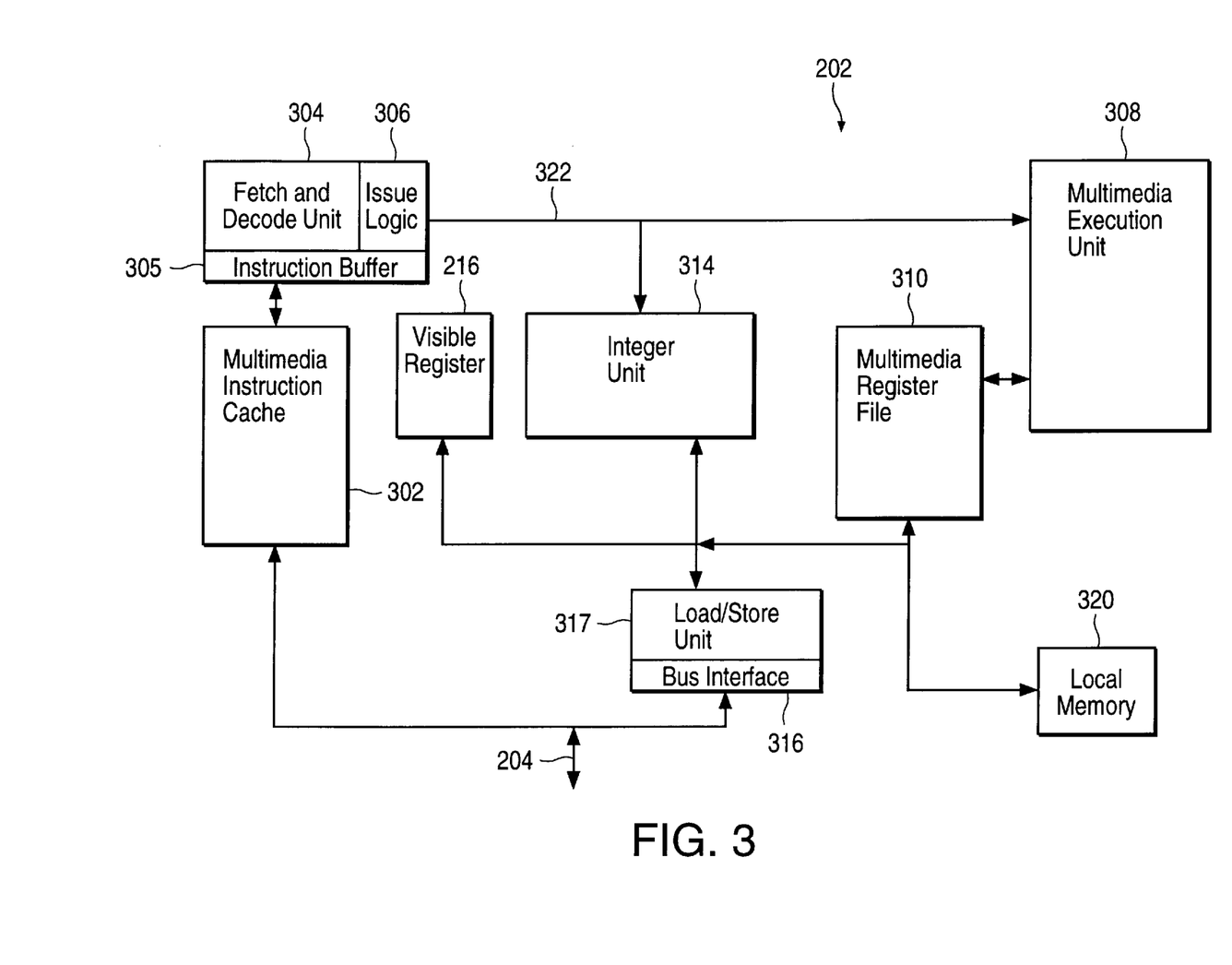
FIG. 3 is a block diagram illustrating a multimedia coprocessor designed in accordance with teachings of the present invention.

FIG. 3 illustrates multimedia coprocessor 202, also referred to as coprocessor 202, designed in accordance with principles of the present invention. As illustrated, coprocessor 202 includes a multimedia instruction fetch and decode unit 304. With the assistance of memory controller 212 (FIG. 2), multimedia instruction cache 302 (FIG. 3) is filled, several cycles in advance of execution, with instructions stored in main memory device 214 (FIG. 2). An instruction buffer 305 (FIG. 3) initially queues up to four instructions in the event multimedia instruction fetch and decode unit 304 stalls due to a structural hazard (i.e. contention for the same hardware resources) or a data hazard (i.e. dependency between data used in different instructions). Multimedia instruction fetch and decode unit 304 in FIG. 3 fetches instructions from instruction buffer 305 and performs dependency checking, instruction grouping, and general instruction flow optimizations when possible. In one embodiment, the multimedia instruction cache 302 interface is 64 bits wide and accepts 32 bit instructions from main memory device 214 (FIG. 2).

Multimedia instruction fetch and decode unit 304 (FIG. 3) issues multiple instructions over bus 322 to a multimedia execution unit 308 and an integer unit 314 which, in accordance with the present invention, allow for different combinations of the following instructions to be issued in the same clock cycle: integer instruction and a load/store instructions using local memory, integer instruction and a multimedia instruction, and two multimedia instructions. Bus 322 includes four separate instruction pipes capable of providing two instructions per cycle to each integer unit 314 and each multimedia execution unit 308. Integer unit 314 is coupled to visible register file 216 and, as previously discussed, receives data and control information from visible register file 216 including starting PC (program counter), interrupt values, processing status, and debugging information.

Multimedia execution unit 308 is coupled to a multimedia register file 310 which has multiple read ports and multiple write ports. In one embodiment, multimedia execution unit 308 and multimedia register file 310 are used to perform one or more instructions from VIS (Visual Instruction Set) as discussed in U.S. patent application Ser. No. 08/ 722,442, filed Oct. 10, 1996, entitled "Visual Instruction Set for CPU with Integrated Graphic Functions", authored by Robert Yung, assigned to the assignee of the present invention and incorporated herein by reference in the entirety, for all purposes. Further details on the operation of integer unit 314 and multimedia execution unit 308 are discussed below.

Multimedia register file 310 and visible register 216 are both coupled to a local memory 320. Local memory 320 is useful for storing information frequently used by either multimedia execution unit 308 or integer unit 314. Unlike a data cache, information stored in local memory 320 does not get moved out by complex cache management techniques. Instead, local memory 320 serves as a deterministic technique for storing information which can readily be moved into local register files such as multimedia register file 310 or the integer register file (not shown) associated with integer unit 314. Generally, local memory 320 allows multimedia applications to execute without latency delays associated with cache misses and typical memory management issues.

Local memory 320 is also used because it is more compact to layout than a multiple port register file having a similar capacity. The latency difference between cache and local memory 320 is made up by preloading data into the local ram and moving the data stored in local memory 320 to visible registers 216 or multimedia register file 310 as needed. Preloading data in multimedia applications or digital signal processing applications is generally predictable. In a multimedia application, the data preloaded typically includes a sequence of data frames and tables used for compressing or decompressing the data frames. For example, local memory 320 is used to store the Huffman coding tables used in MPEG decoding. These Huffman code tables are a predetermined set of tables used to generate the smallest code by associating the most frequently used symbols in a compressed MPEG bit stream with the shortest binary sequences and the least frequent symbols in a compressed MPEG bit stream with the longest binary sequences. Keeping these Huffman coding tables in local memory 320 enables MPEG decoding to be performed quickly.

Coprocessor 202 also includes a load/store unit 317 which is coupled to a bus interface 316. Load/store unit 317 loads data values from main memory device 214 (FIG. 2) or local memory 320 in FIG. 3 as needed by integer unit 314 and multimedia execution unit 308. The present invention also includes load/store operations to operate on large blocks of data, such as 64 bytes at a time. These load/store operations can occur between local memory 320, visible registers 216, multimedia register file 310, and integer register file (not shown). Bus interface 316 has been designed to simplify the management of read-after-write (RAW) and write-after-read (WAR) data hazards, which typically arise in pipelined architectures, by flushing the buffer in load/store unit 316. Flushing the load/ store buffer is more easily implemented than keeping track of outstanding loads and stores typically used in other architectures. This flushing strategy is reasonable since data in multimedia processing is generally in a fixed sequence and not random. For example, a RAW data hazard occurs when multiple loads and stores address the same memory location. A load operation reading from a particular memory location will receive incorrect information if a store operation to the same address was first in program order but had not written to the address. Accordingly, when the RAW condition is detected, the affected loads are stalled while the load/store buffer is flushed and stores the values to the memory address. After the buffer is flushed and values are stored to memory or disk, the loads are performed on valid data.

Multimedia Coprocessor Architecture: Multimedia Execution Unit

Figure 4:
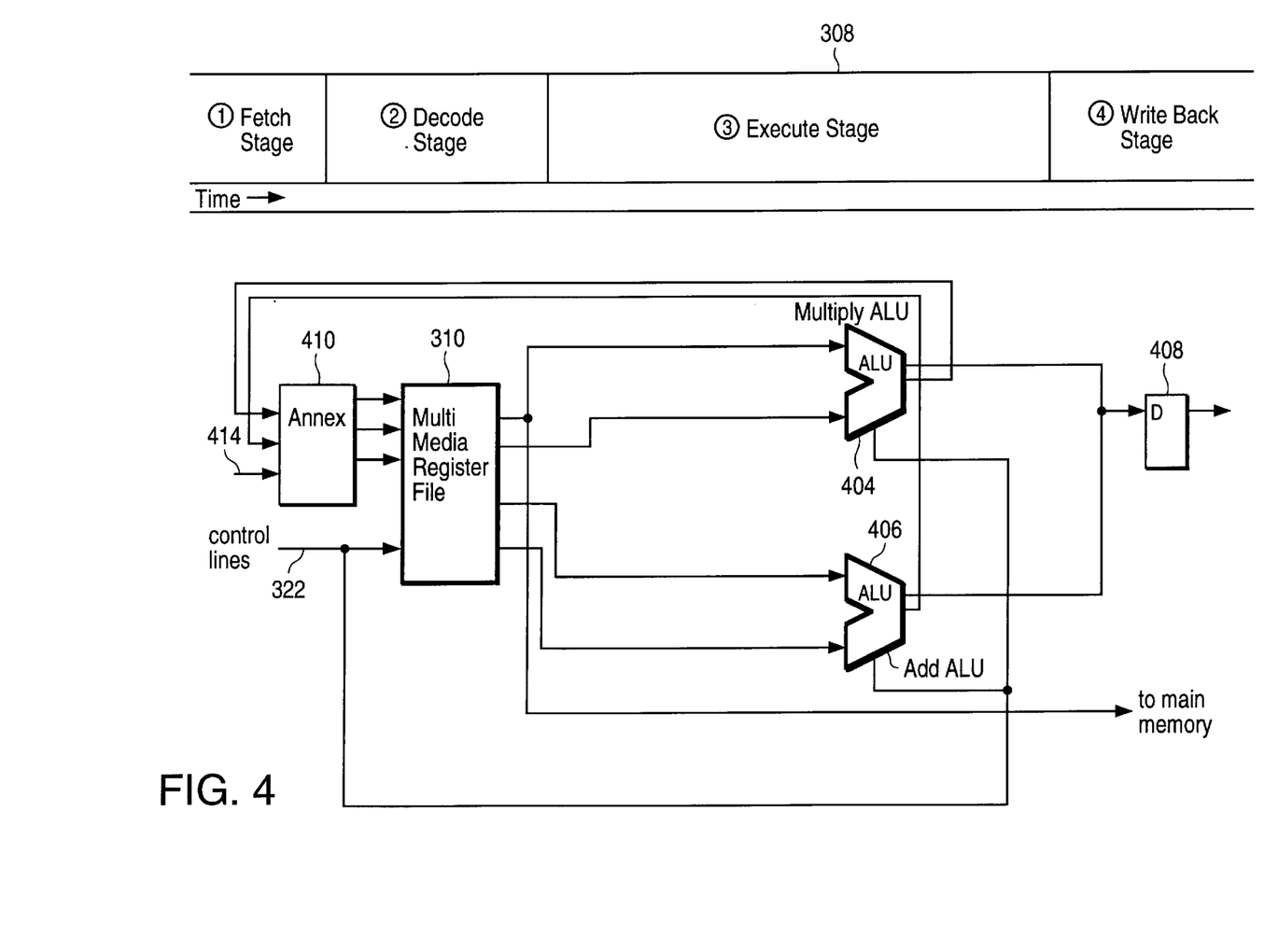
FIG. 4 is a block diagram illustrating a multimedia execution unit within the multimedia coprocessor designed in accordance with the present invention in more detail.

Referring now to FIG. 4, a high level circuit diagram illustrates multimedia execution unit 308 in more detail.

Multimedia execution unit 308 includes a multiported multimedia register file 310 coupled over two partitioned execution paths to a multiply unit (multiply ALU) 404 and a carry adder unit (adder ALU) 406 respectively. Multimedia instruction fetch and decode unit 304 (FIG. 3) provides decoded instructions to multimedia execution unit 308 (FIG. 4) over bus 322 which operate multiply unit 404 and carry adder unit 406. Bus 322 selects which registers in multimedia register file 310 are written to by an annex 410 and which register values are provided to multiply unit 404 and carry adder unit 406. Separate pipelined paths to both these units allows each unit to receive an instruction each clock cycle.

Annex stage 410 ensures that program order is maintained between "older" instructions (instructions occurring earlier in program order) and "younger" instructions (instructions occurring later in program order) issued over a pipelined path. When a younger instruction completes before the older instruction, processing the younger instruction is stalled and the younger instruction is temporarily held in the annex stage 410 until the older instruction completes. After the older instruction is processed, annex stage 410 allows the younger instruction to update the register file and complete. This maintains program order. Data annex 410 is particularly useful in handling data dependencies or structural dependencies without complex forwarding circuitry or bypass circuitry often used in other superscalar pipelined computer architectures. For more information on data annex 410, see U.S. patent application Ser. No. 08/153,814, filed Nov. 17, 1993, entitled "TEMPORARY PIPELINE REGISTER FILE FOR A SUPERPIPELINED SUPERSCALAR PROCESSOR", authored by Robert Yung, William N. Joy, and Marc Tremblay, assigned to the assignee of the present invention and herein incorporated by reference.

The functions and constitutions of multiply unit 404 are similar to multiply units well known in the art except that the hardware is replicated multiple times to allow multiple multiplications to be performed on different partitioned portions of the operands. Accordingly, the carry bits in each partition can be overridden to break the operand into multiple portions and prevent an overflow condition.

Similarly, the functions and constitutions of add unit 406 are similar to carry adder units found in the art except that the hardware is replicated multiple times to allow multiple adds to be performed on different partitioned portions of the operands. Additionally, the carry chain can be optionally broken into multiple smaller chains and prevent an overflow from occurring.

Referring to FIG. 4, multimedia unit 308 operates in a four stage pipeline including the following stages: a fetch stage; a decode/issue stage; an execute stage; and writeback stage. Initially, instructions are fetched from instruction cache 302 (FIG. 3). In the next stage, an instruction is decoded in the first stage and used to select registers in multimedia register file 310. Except for certain instructions, multiply unit 404 and add unit 406 are executed in a single cycle. In the fourth stage, the resulting values are written to the multimedia register file 310 for further processing by later instructions. This simplified pipeline reduces the amount of data and structural hazards and the need for extensive dependency checking and complex forwarding circuitry in the instruction decoder unit.

Multimedia Coprocessor Architecture: Integer Execution Unit

Figure 5:
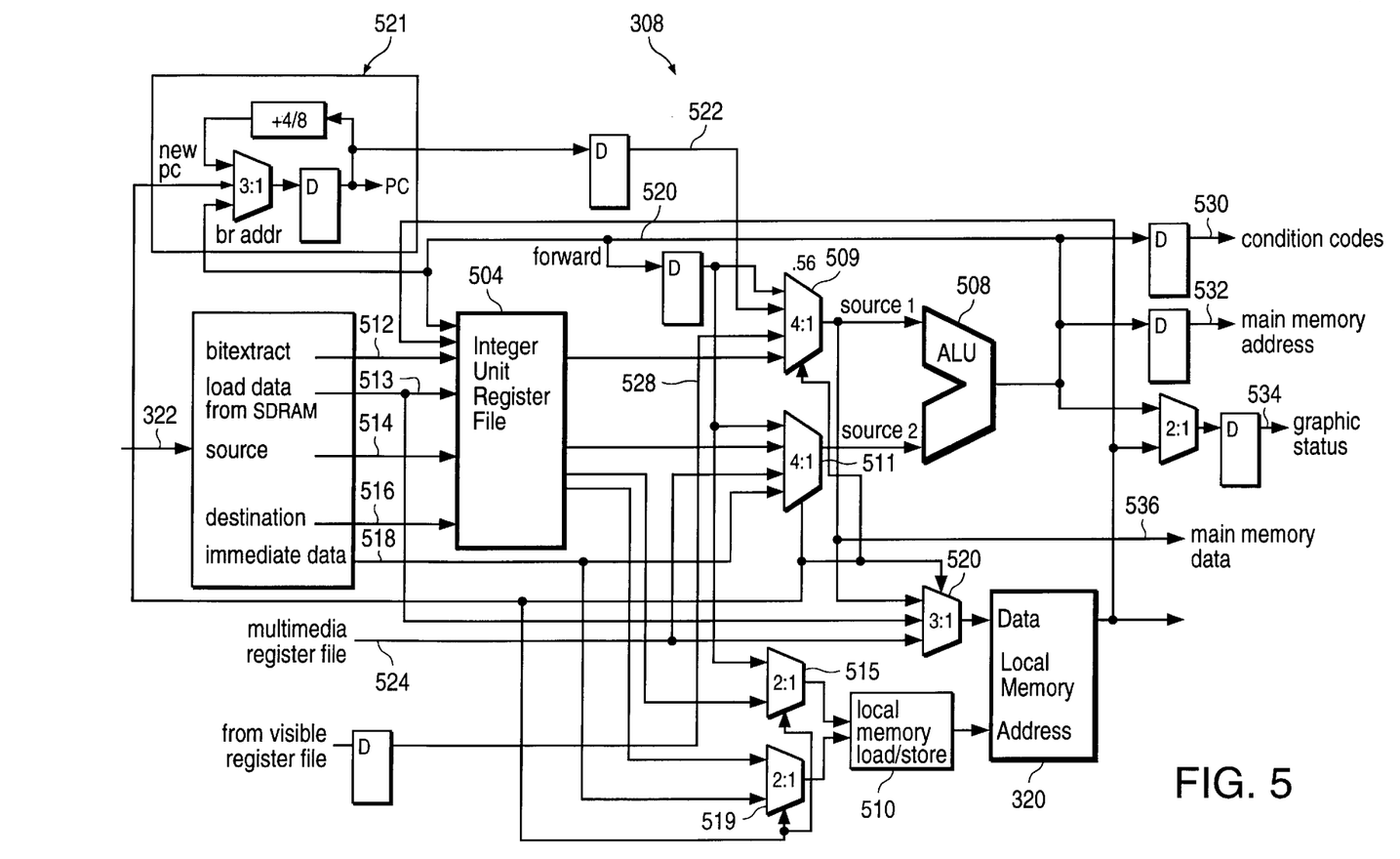
FIG. 5 is a block diagram illustrating an integer execution unit within the multimedia coprocessor used by one embodiment of the present invention.

Referring now to FIG. 5, a high level circuit diagram illustrates an integer execution unit 308 used by one embodiment of the present invention. Integer unit 308 performs a variety of integer arithmetic calculations including the control of program counter (PC) during execution. A branch unit 521 assists integer execution unit 308 in the calculation of the PC while instructions are being executed. Operation of integer execution unit 308 depends on specific decoded instruction provided to the integer execution unit 308 over bus 322.

Multimedia instruction fetch and decode unit 304 (FIG. 3) provides decoded instructions to integer execution unit 314 over bus 322 which operates arithmetic logic unit (ALU) 508 (FIG. 5) and a local memory load/store device 510 used for moving data in and out of a local memory 320. An integer unit register file 504 is coupled to receive data from four input sources including a bit extract input 512, a main memory input 513 from main memory device 214, a local memory 320, and an arithmetic and logic unit (ALU) 508. The combination of inputs allows integer execution unit 308 to provide a wide variety of integer based calculations.

Bit extract input 512 provides integer unit register file 504 with a variable number of bits at a variable offset extracted from a register in the multimedia register file 310 (FIG. 3). A separate line is provided for the bit extract input because the bit extract operation may take more than one cycle to execute. Values provided over bit extract 512 are written into integer register file 504 for later calculations in the integer unit. For example, the bit extract instruction in the Visual Instruction Set (VIS) is useful for extracting a series of bits from a register storing pixels from a portion of an image. Input 512 stores these extracted bits into register file 504 where they can be processed using ALU 508.

Main memory input 513 from main memory device 214 provides integer unit register file 504 with data values stored in memory. These values can be used for performing pointer arithmetic or any other calculation on values stored in memory.

In FIG. 5, a destination input 516 from bus 322 provides a register address in integer register file 504 and determines which of the above input sources is written to a register in integer unit register file 504. On the output side of integer register file 504, a source input 514 selects which register values are provided by integer unit register file 504 to ALU 508, local memory 320, and to local memory load/store device 510.

ALU 508 is coupled to a MUX 509 and a MUX 511, as shown in FIG. 5, that select which input values are used for arithmetic and logical calculations provided by ALU 508. The selection of these input values are controlled by decoded instructions provided over bus 322. The input values selectable by MUX 509 and a MUX 511 includes a forwarding input 520 for ALU 508 if results needed immediately. Immediate results are fed back into ALU 508 over forwarding input 520 when the time delay through integer unit register file can not be tolerated.

A PC (program counter) input 522 is another input value selectable by MUX 509. The PC input 522 can be routed to ALU 508 and used for arithmetic calculations relating to branching and sequencing the execution of instructions.

Further, MUX 511 can also select input values from a multimedia register value input 524. Values stored in multimedia register file 310 (FIG. 3) can be transferred over multimedia register value input 524 to integer register unit 308 for integer processing on ALU 508 or for storage in local memory 320.

Both MUX 509 and MUX 511 are also capable of providing ALU 508 with immediate values stored in decoded instructions and provided over bus 322. Immediate values are useful for looping instructions and, in some cases, advancing the program counter (PC).

In FIG. 5, source input 514 can be used to select which values local memory 320 and local memory load/store device 510 receive from integer unit register file 504. In one embodiment, local memory 320 is a 4 Kb SRAM and local memory load/store device 510 is a 12-bit address adder configured to move data in and out of the local memory into local register files such as integer unit register file 504 and multimedia unit register file 310 (FIG. 3). Local memory 320 in FIG. 5 receives an address input from local memory load/store device 510 and data input from other areas within integer unit 314 through MUX 520. Local memory load/ store device 510 provides an address and offset within local memory 320 where the data is located or where the data should be stored. As discussed above, local memory 320 is particularly useful for storing Huffman codes, macroblocks, signal data, and other signal processing information typically used in coding or decoding multimedia bit streams such as MPEG video and Digital Dolby/AC-3 audio. Local memory 320 is particularly useful in digital signal processing applications where the location of data is predictable but must be processed quickly. When managed properly, local memory 320 can offer high performance while taking up less die space and costing less than traditional register files.

Visible register file input 528 is a novel technique for coupling a multimedia coprocessor 202, with a general purpose processor in a modular manner. The visible register file input 528 provides a conduit for multimedia coprocessor 202 to receive important processing information from hardware processor 200, such as a stack based processor, with a minimal amount of circuitry. Accordingly, both MUX 509 and MUX 511 selectively route data from visible register file 216 (FIG. 2) over visible register file input 528 for processing on ALU 508.

Figure 6:
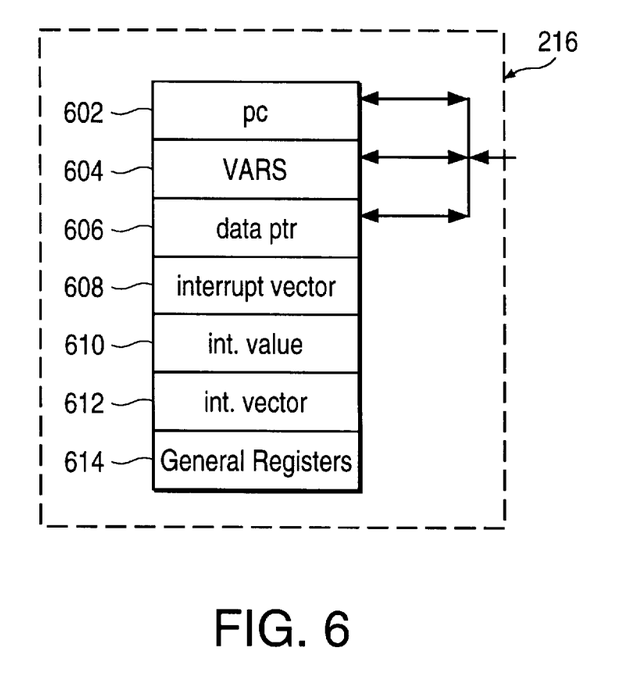
FIG. 6 is a more detailed illustration of visible register file used to provide execution parameters to a coprocessor designed in accordance with the present invention.

FIG. 6 provides a detailed illustration of visible register file 216 used for passing data between hardware processor 200 and multimedia coprocessor 202. Register file 216 includes storage for a PC 602 (program counter), a VARS storage 604 for storing local variables, a data pointer 606 for storing the location of data in memory, an interrupt vector 608 for sending interrupts back to hardware processor 200 (FIG. 2), an interrupt value 610 entry for further enumerating the interrupt type, an interrupt vector 612 for selecting the types of valid interrupts which should be monitored, and general registers 614. Typically, general registers 614 include all the register values for multimedia coprocessor 202 (FIG. 2) for diagnostics and status on the processor.

The results provided from integer unit 314, as illustrated in FIG. 5, include condition codes 530, a main memory address 532 for indicating which area to store to in main memory device 214 (FIG. 2), a graphics status output 534 for VIS (visual instruction set) instructions, and main memory data out 536 for providing data to be written to main memory device 214 (FIG. 2).

Figure 7:
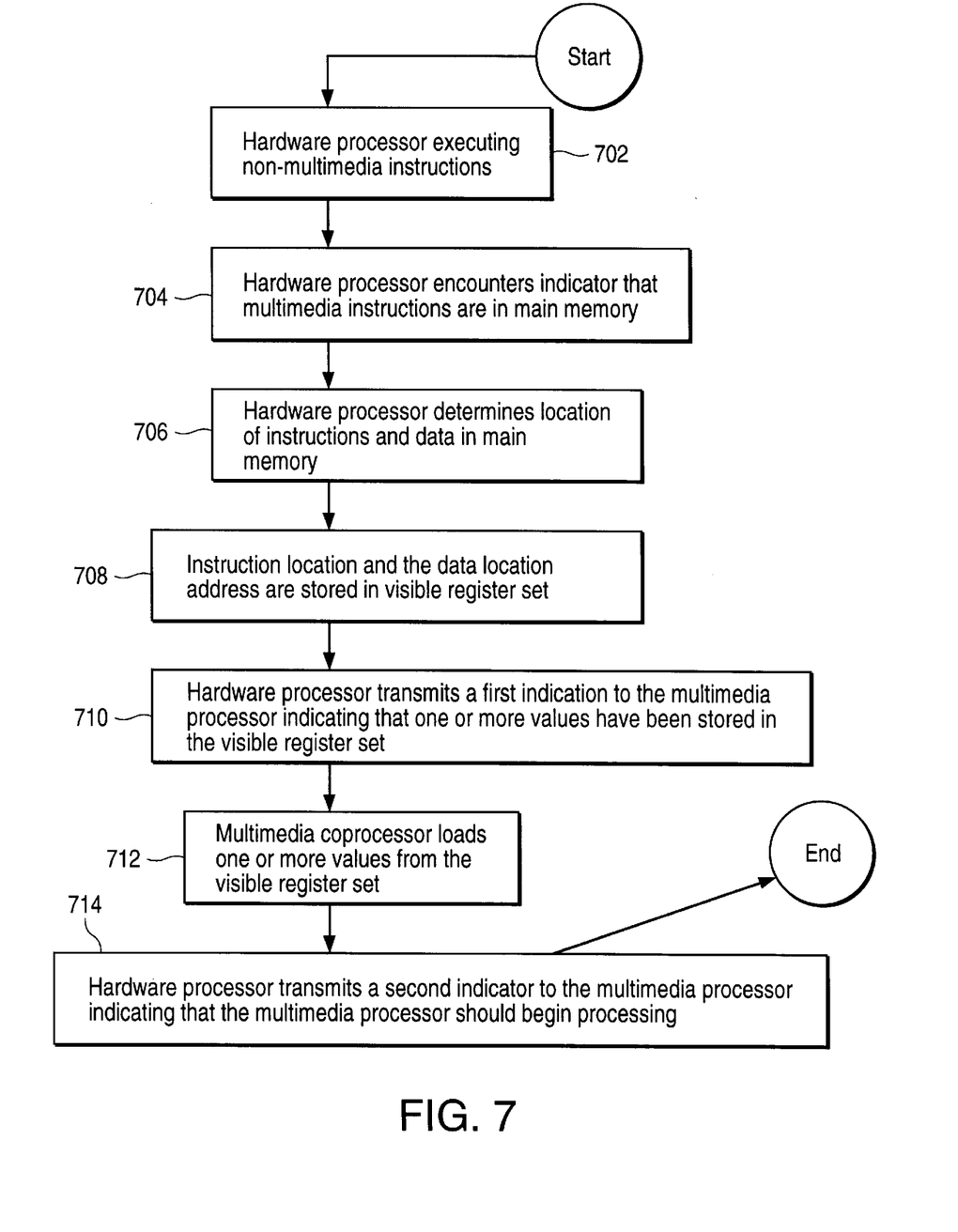
FIG. 7 is a flowchart indicating the overall steps used by one embodiment of the present invention for processing multimedia instructions on the multimedia coprocessor.

Exemplary Method for Processing on the Hardware Processor and the Multimedia Coprocessor Referring now to FIG. 7, a flowchart indicates the overall steps used by one embodiment of the present invention for processing multimedia instructions on the multimedia coprocessor. Initially at step 702, the hardware processor is executing a instruction stream of one or more non-multimedia instructions. For example, the hardware processor can be a stack processor designed according to the PicoJava stack architecture and the instructions can be a series of bytecodes derived from a JAVA based application downloaded over the Internet and executing on the stack based machine. Typically, JAVA can not perform multimedia applications such as MPEG decoding efficiently because many of the pixel operations are done sequentially.

At step 704, the hardware processor encounters an indicator within the instruction stream that one or more multimedia instructions are contained within the main memory device. This indicator can be an interrupt, a message from the operating system, or can also be a special instruction which explicitly indicates that a multimedia application is in memory. Typically, the multimedia application contained in main memory 214 (FIG. 2) is not compatible with the hardware processor 200 and is compiled specifically for multimedia coprocessor 202. For example, assume hardware processor 200 is stack based processor discussed above and is only capable of executing bytecodes or their equivalents as produced with a JIT Oust-in-time compiler). Also assume, a multimedia application in main memory main memory 214 is typically compiled to execute on a processor compatible with VIS (visual instruction set). Thus, hardware processor 200 must indicate to multimedia coprocessor 202 that the multimedia application is in memory. The stack processor then writes the multimedia application instructions into a particular memory location as data.

Next, at step 706 hardware processor 200 (FIG. 2) determines an instruction location where the one or more multimedia instructions are located in memory. Hardware processor 200 also determines a data location in main memory where the one or more data values associated these multimedia instructions are located. Instructions and data are used together for performing the desired multimedia application. Generally, the indicator encountered in step 704 will also provide the location of multimedia instructions and data in main memory. Hardware processor 200 must process these values before providing them to the multimedia coprocessor including possibly decoding the addresses if they are compressed or encrypted.

At step 708, the instruction location and the data location address are stored in visible register set 216 (FIG. 2). As previously discussed above visible register set 216 is one novel aspect of the present invention which enables hardware processor 200 to communicate with the multimedia processor 202. These visible registers in visible register set 216 allow hardware processor 200 to set up initial execution values for multimedia coprocessor 202 to locate instructions in memory 214, execute the instructions, and communicate the results of the execution back to hardware processor 200. Accordingly, in one embodiment, the instruction location and data location are stored in a program counter (PC) register 602 (FIG. 6) and a data pointer register 606 location respectively, both registers being located in visible register set 216.

Once visible register set 216 is loaded, hardware processor 200 transmits a first indicator to multimedia coprocessor 202 at step 710 (FIG. 7) indicating that one or more values have been stored in visible register set 216. In response to this first indicator, processing continues at step 712 and multimedia coprocessor 202 loads the instruction location stored in program counter (PC) register 602 (FIG. 6), and other values stored in the registers in visible register set 216. At step 714, hardware processor 200 transmits a second indicator to multimedia coprocessor 202 indicating that multimedia coprocessor 202 should begin processing the multimedia instructions located in memory 214. In accordance with the steps outlined above, hardware processor 200 acts as a master in controlling the execution of multimedia coprocessor 202.

At some point during the processing of the multimedia instructions, multimedia coprocessor 202 can optionally transmit an indication to hardware processor 200 indicating processing status. Multimedia coprocessor 202 can use the visible registers to send indicators to hardware processor 200 or, alternatively, can use interrupts, message passing, or other inter-processor communication techniques well known to those skilled in the art of multiprocessor architecture.

Figure 8:
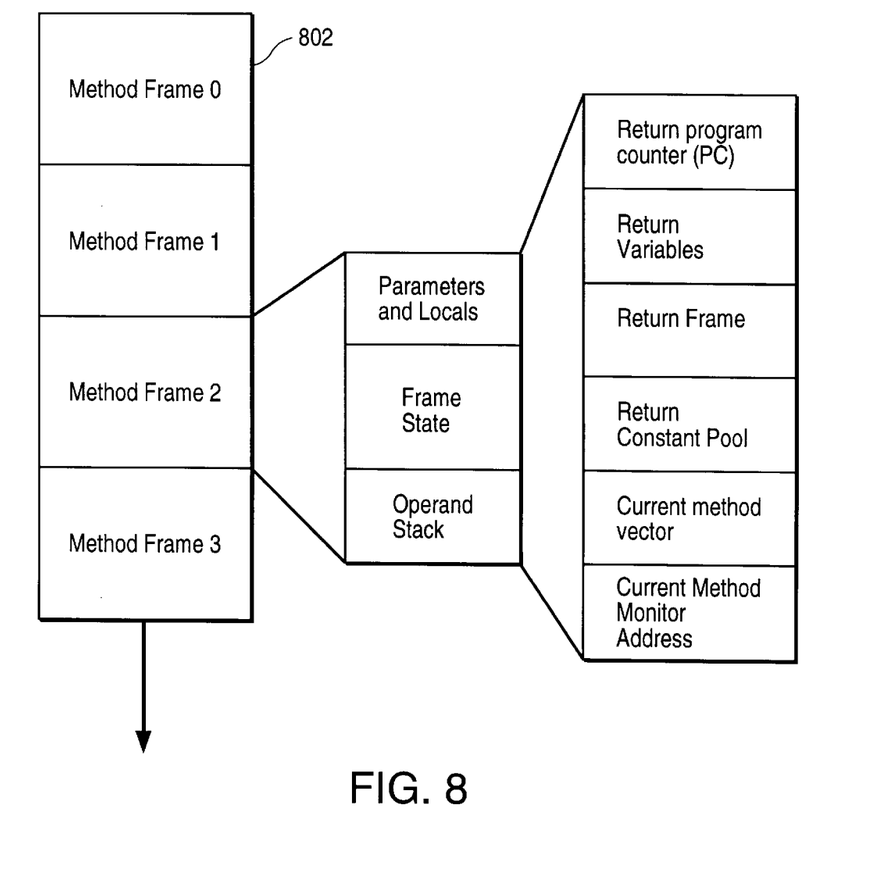
FIG. 8 is a block diagram illustrating the relationships between a method frame used by the Java Virtual Machine and the organization of the stack used in the PicoJava stack architecture.

In practice, different hardware processors can take advantage of the processing capabilities of multimedia coprocessor 202. Specifically, visible register file 216 interfaces well with a stack processor based on the PicoJava stack processor design by Sun Microsystems. Referring to FIG. 8, a block diagram illustrates the relationships between a method frame used by the Java Virtual Machine and the organization of the stack used in the PicoJava stack architecture. The PicoJava processor implements a hardware stack 802 which directly supports the Java Virtual Machine stack architecture. During execution, a Java Virtual Machine creates a method frame for each method called by an application at execution time. Methods are groups of instructions used to operate on objects instantiated using an object oriented programming language such as Java. As illustrated in FIG. 8, a method frame in the stack contains parameters and local variables, a frame state for holding the PicoJava execution state, and an operand stack used for passing values. To control a multimedia coprocessor of the present invention, a method for processing a multimedia object is given a special method frame and pushed on the PicoJava stack. Later, the special method frame is popped off the stack and passed to the multimedia coprocessor for processing using visible register file 216. After the multimedia coprocessor has completed processing the multimedia object, such as an MPEG video, the resulting values are stored in a method frame and pushed back on the PicoJava stack. Thus, embodiments of the present invention can be eloquently integrated into the hardware and software associated with the PicoJava stack processor.

Embodiments of the invention provide a novel architecture with several advantages. First, the coprocessor is designed in a modular manner and can be easily integrated for use by a hardware processor. The visible register file can be written to by the hardware processor indicating where a multimedia application is loaded in memory. The hardware processor can also receive interrupts and interrupt values indicating what is the coprocessor's execution status. In particular, embodiments of this invention can be used to accelerate the performance of a stack based processor, such as the PicoJava processor designed by Sun Microsystems, Inc., by adding a coprocessor designed in accordance with the present invention. The coprocessor executes VIS (visual instruction set) instructions, also designed and by Sun Microsystems, Inc., for performing multimedia operations.

A coprocessor designed in accordance with the present invention is also advantageous because it executes a stream of instructions separate from the hardware processor. A separate fetch and decode unit in the coprocessor is used to decode instructions while the hardware processor continues to execute. This reduces the data dependencies and the structural dependencies. Thus, separate instruction steams provides close to multiprocessor performance.

Coprocessors of the present invention are also advantageous because multimedia applications often need dedicated amounts of memory and other resources to perform multimedia operations. On-chip local memory on the coprocessor can be allocated exclusively to a multimedia application while the hardware processor is processing another portion of the application. The sequential nature of data used in multimedia applications allows for data values to be fetched in advance and placed in local memory. Consequently, memory latency is hidden and multimedia operations, such as video, appear to be smooth and consistent.

While specific embodiments have been described herein for purposes of illustration, various modifications may be made without departing from the spirit and scope of the invention. Those skilled in the art understand that the present invention can be implemented using a variety of different hardware processors and multimedia processors coupled together in accordance with teachings of the present invention.

Accordingly, the invention is not limited to the above described embodiments, but instead is defined by the appended claims in light of their full scope of equivalents.

What is claimed is:

1. A computer processor complex comprising:
   a visible register set including registers for a program counter and a data pointer;
   a hardware processor operatively coupled to a first bidirectional port on the visible register set;
   a multimedia coprocessor operatively coupled to a second bidirectional port on the visible register set; and
   a main memory device operatively coupled to the hardware processor over a first bidirectional port and operatively coupled to the multimedia processor over a second bidirectional port, wherein the visible register set facilitates communication between the hardware processor and the multimedia coprocessor.

2. The computer processor complex of claim 1, wherein the hardware processor is a stack based processor.

3. The computer processor complex of claim 1, wherein the hardware processor is a stack based processor compatible with the PicoJava stack based architecture.

4. The computer processor complex of claim 1, wherein the multimedia coprocessor further comprises:
   an instruction fetch and decode unit operatively coupled to a plurality of execution units including,
      at least one coprocessor integer execution unit operatively coupled to the second bidirectional port on the visible register set,
      at least one coprocessor multimedia execution unit having a plurality of integer execution units;
   a first register file operatively coupled to the at least one coprocessor multimedia execution unit;
   a second register file operatively coupled to the at least one coprocessor integer execution unit;
   a memory device operatively coupled to the at least one coprocessor integer execution unit and containing instructions and data for execution on the multimedia coprocessor.

5. The multimedia coprocessor of claim 4 wherein the at least one coprocessor multimedia execution unit includes a superscalar architecture and each of the execution units includes a plurality of pipelined stages.

6. The multimedia coprocessor of claim 4, wherein the at least one coprocessor integer execution unit further comprises an ALU execution unit and a local memory unit, each separately coupled to the instruction fetch and decode unit.

7. The multimedia coprocessor of claim 6, wherein the local memory unit includes a load/store device.

8. The multimedia coprocessor of claim 6, wherein the local memory unit is operatively coupled to the second register file.

9. The multimedia coprocessor of claim 6, wherein the local memory unit is operatively coupled to the first register file.

10. The multimedia coprocessor of claim 4, wherein the at least one coprocessor multimedia execution unit further comprises a first integer execution unit and a second integer execution unit, each separately coupled to the instruction fetch and decode unit.

11. The at least one coprocessor multimedia execution unit of claim 10, wherein the first integer execution unit includes a multiply ALU, and the second ALU includes an adder ALU.

12. A method executed on a computer processor complex, including a hardware processor and a multimedia coprocessor, for processing one or more multimedia instructions, the method comprising the steps of:

determining, using the hardware processor, an instruction location in a main memory device corresponding to the one or more multimedia instructions and a data location in the main memory device corresponding to the one or more data values associated with the one or more multimedia instructions;

storing the instruction location in a program counter register associated with a visible register set;

storing the data location in a data pointer register associated with the visible register set;

loading the multimedia coprocessor with the instruction location stored in the program counter register;

loading the multimedia coprocessor with the data location stored in the data pointer register; and     executing, using the multimedia coprocessor, the one or more multimedia instructions located at the instruction location using data located at the data location stored in the main memory device.

13. The method of claim 12, further including before the determining step, the step of:

executing an instruction stream of one or more non-multimedia instructions on a hardware processor; and     encountering an indicator within the instruction stream, that one or more multimedia instructions are contained within the main memory device.

14. The method of claim 12, further including after the step of storing the data location in a data pointer, the step of:

transmitting a first indication to the multimedia processor indicating that one or more values have been stored in the visible register set; and     transmitting a second indication to the multimedia processor that the multimedia processor should begin processing the multimedia instructions.

15. The method of claim 12, further including after the executing step, the step of:

transmitting an indication to the hardware processor indicating the execution status associated with the multimedia processor.

* * * * *